United States Patent [19]

Saito et al.

[11] Patent Number: 4,710,780

[45] Date of Patent: Dec. 1, 1987

[54] RECORDER WITH SIMULTANEOUS APPLICATION OF THERMAL AND ELECTRIC ENERGIES

[75] Inventors: Koichi Saito; Yoshihiko Fujimura; Nanao Inoue, all of Kanagawa, Japan

[73] Assignee: Fuji Xerox Co., Ltd., Tokyo, Japan

[21] Appl. No.: 30,437

[22] Filed: Mar. 26, 1987

[30] Foreign Application Priority Data

Mar. 27, 1986 [JP] Japan .................................. 61-67308

[51] Int. Cl.$^4$ ......................... G01D 9/00; G01D 15/18

[52] U.S. Cl. ................................ 346/1.1; 346/140 R; 346/75

[58] Field of Search ............. 346/140 PD, 140 R, 1.1, 346/75

[56] References Cited

U.S. PATENT DOCUMENTS 3,790,703 2/1974 Carley ................................. 346/1.1
4,333,086 6/1982 Ebi ............................... 346/140 PD
4,383,265 5/1983 Kohashi ....................... 346/140 PD

FOREIGN PATENT DOCUMENTS 0090775 5/1985 Japan ............................ 346/140 PD

*Primary Examiner*—E. A. Goldberg
*Assistant Examiner*—Huan Tran
*Attorney, Agent, or Firm*—Finnegan, Henderson, Farabow, Garrett and Dunner

[57] ABSTRACT

An ink jet method and image recording head for jetting a liquid coloring agent, or ink, wherein there are provided a pair wall members with spaced-apart inner faces to contain the ink, the edges of the wall members forming a discharge opening on one side thereof; electrodes for applying an electric field to ink between the inner faces; one or more heating elements on one of the inner faces for heating an area thereof; and wherein an unevenness, or corrugations, are provided on one of the inner faces near the discharge opening and positioned relative to the heating element to control erroneous jetting of the ink.

7 Claims, 14 Drawing Figures

RECORDER WITH SIMULTANEOUS APPLICATION OF THERMAL AND ELECTRIC ENERGIES

FIELD OF THE INVENTION

This invention relates to a non-impact image recording device for recording by jetting a liquid coloring agent such as ink at a recording member.

BACKGROUND OF THE INVENTION

Non-impact recording, or the ink jet method of recording, is becoming a popular method for converting image data in the form of electrical signals into hard copies because it produces less noise during recording than does impact printing. The ink jet method is also useful because it operates with ordinary paper without the need for a special process, such as fixing, in order to produce a permanent record.

The ink jet method that has already been put to practical use involves filling an airtight container with ink, applying a pressure pulse to the container, and sending the ink out of an orifice of the container in a jet for recording purposes. The ink jet apparatus used in such method, however, cannot be made compact due to its operating mechanism. The apparatus also requires mechanical scanning to record at a desired image density, which causes the recording speed to be reduced.

At the same time, there have been proposed techniques for remedying shortcomings inherent in the ink jet method and making high-speed recording possible. The magnetic ink jet method is a typical example of such improvement and is accomplished by providing magnetic ink close to a magnetic electrode array, forming an ink-jet state corresponding in position to a picture element by making use of a swell of the ink in the presence of a magnetic field, and jetting the magnetic ink in the presence of a static electric field. Since this method admits of electronic scanning, high-speed recording becomes possible, however, the selection of ink and coloration characteristic of the ink jet method are limited.

In addition to the aforesaid methods, the so-called plane ink jet method is also well known. This method, involves arranging ink in a slitlike inkholder in parallel to an electrode array, and jetting the ink in accordance with an electric field pattern formed between an electrode facing the electrode array so that ink droplets selectively impact upon an intervening recording paper. Since no minute orifice for storing ink is required in this method, ink clogging can be prevented. However, a high voltage must be applied to jet the ink droplets which makes it necessary to drive the electrode array on a time division basis to prevent a voltage leak across the adjoining or neighboring electrodes. Consequently, the recording speed is limited.

There has also been proposed the so-called heat bubble jet method for jetting ink out of an orifice by means of thermal energy. In this method, the ink is abruptly, locally heated to cause film boiling and a pressure rise resulting from the rapid formation of bubbles within the orifice is utilized to jet the ink. However, the film boiling temperatures are as high as 500°–600° C. and this makes it difficult to put the aforesaid method to practical use because the ink properties tend to change at high temperatures and the protective layer on the heating resistor also deteriorated.

As set forth above, many problems are still present in the ink jet methods heretofore developed. Such problems include limitations on recording speed, the necessity of employing special ink and contriving a particular driving means, and thermal deterioration of the ink and the heating elements.

OBJECT AND SUMMARY OF THE INVENTION

The present invention is intended to solve the above problems, and it is therefore an object of the invention to provide an image recording head for recording images at high speed and without limitation in selecting the ink used.

The present invention provides an image recording head for letting fly, or jetting, a liquid coloring agent at a recording member comprising a pair of wall members arranged a fixed space apart to contain a liquid coloring agent between the inner faces thereof, the edges of the wall members forming a discharge portion on one side thereof; thermal energy applying means for heating the liquid coloring agent when placed between the wall members; electric energy applying means for applying an electric field to the liquid coloring agent when placed between the wall members; the thermal energy applying means comprising at least one heating element on the inner face of one of the wall members for heating an area thereof; and wherein the inner face of at least one of the wall members is provided with a methodically uneven pattern, preferably in the form of corrugations, parallel to the edges of the wall members forming the discharge portion, the unevenness being arranged in relationship to the heating element to control the jetting of the liquid coloring agent.

The operation of the image recording head according to the present invention comprises selectively applying the electric and thermal energies to the liquid coloring agent and jetting the agent located in the area to which both the energies have been applied. This aforesaid method is implemented by uniformly applying an electric field to the whole liquid coloring agent. In this state, the agent is not stimulated sufficiently to be jetted. Thermal energy is selectively, or locally, applied to the agent, whereby the agent located in the area receiving the thermal energy is caused to be jetted out from the discharge portion of the recording head.

A plurality of heating elements, for instance, are arranged in the form of an array parallel to the edges of the wall members forming the discharge portion and in contact with the a liquid coloring agent. The heating element located in a position corresponding to a recording picture element is selectively heated while a uniform electric field is applied to the whole liquid coloring agent. Thus, the liquid coloring agent is caused to be jetted at a recording member at the location of the selected heater.

By the repetition of the aforesaid process, a picture element train in the form of a line is recorded and, by electrically scanning the recording member, an image can be recorded.

The space formed between the pair of wall members is filled with ink according to the present invention. The edges on one side of the wall members are used as an ink discharge portion. The liquid coloring agent is heated by the heating elements installed on the inner face of one of the wall members and caused to be jetted out from the discharge portion. In this case, the continuous unevenness formed in the ink discharge portion restrains the ink from flying out from an unheated area and makes controllable high-speed ink jetting possible. In consequence, high-speed reliable recording can be performed.

BRIEF DESCRIPTION OF THE DRAWINGS

The present invention will be better understood by reference to the accompanying drawings wherein.

DETAILED DESCRIPTION OF THE INVENTION

Figure 2A:
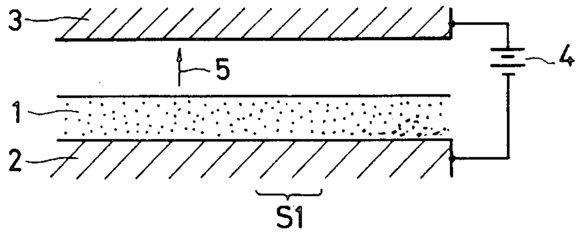
FIGS. 2(A)–2(C) are schematic diagrams illustrating the recording principles according to the present invention.

As shown in FIG. 2(A), a liquid coloring agent 1 is arranged between a base electrode 2 and an opposite electrode 3. The liquid coloring agent 1 is preferably ink (hereinafter referred to as simply the "ink 1") having a suitable electrical resistance and being a liquid during operation of the recording head. The base electrode 2 and the opposite electrode 3 are both conductive plates.

A d.c. power supply 4 applies voltage across the electrodes 2, 3 to impose a fixed static electric field on the ink 1. The Coulomb force corresponding to the sum of the inductive charge and by the static electric field acts on the free surface of the ink to urge the ink 1 to jet in a direction 5.

On the other hand, the surface tension, interfacial tension and viscosity resistance of ink prior to jetting acts as a drag. FIG. 2(A) shows the state in which the drag is greater than the Coulomb force and the surface of the ink remains flat.

Figure 2B:
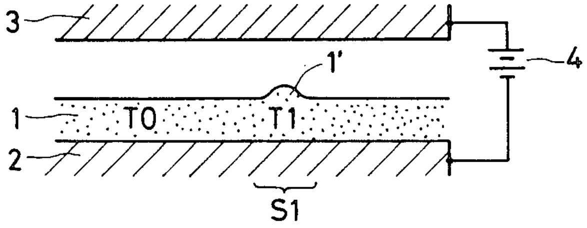
Figure 2C:
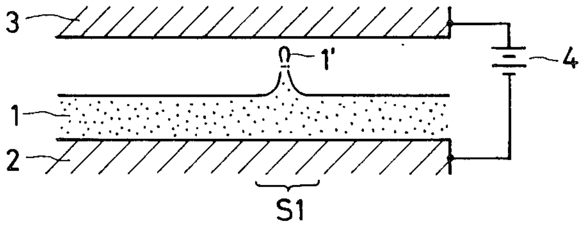

The ink 1 is then locally heated. As shown in FIG. 2(B) the temperature an area S1 raised to T1 which is higher than the temperature of T0 in the rest of the ink. As shown in FIG. 2(B), the ink level in the area S1 is caused to swell, due to a reduction in the drag in the area S1 because of the higher ink temperature and to the of the Coulomb force. The electric field is more concentrated in the swollen portion 1' of the ink 1 and the action of the Coulomb force is further accelerated. Ultimately, the ink portion 1' in the area S1 grows in the form of a column as shown in FIG. 2(C) and a droplet will be emitted or jetted to the opposite electrode 3. This phenomenon can be brought about rapidly with only locally heating the ink as the surface of the heated area undergoes a phase change resulting from film boiling.

As is apparent, the selected application of thermal as well as electrical energies allows selective jetting of ink in selected areas subjected to area of the energies. The locations at which the ink is caused to be jetted and the timing of jetting is controllable.

The aforesaid principle can be demonstrated through the following experiments.

The ink 1 was arranged on the base electrode 2 as shown in FIG. 2(A) and, while the temperature thereof was kept constant, the voltage of the power supply 4 was gradually raised. When the voltage exceeded a certain level, an ink portion 1' shown in FIG. 2C began to grow toward the opposite electrode 3 in randomly located columns. This phenomenon is explained as the growth of an unstable electrical fluid mechanical wave in "FIELD COUPLED SURFACE WAVES"; pp. 61–66, J. R. Melcher (M. I. T. Press).

The Coulomb force is locally concentrated in the columns when the Coulomb force acting in the upward direction perpendicular to the ink liquid level is no longer in equilibrium with the drag that resists growth in the upward direction. As the Coulomb force overcomes the drag the ink column is caused to grow.

In the present invention, the electric field is selected as to be insufficient, by itself, to cause ink columns to grow. Accordingly to the present invention the ink must also be heated in the presence of the electric field to reduce the surface tension and viscosity of the ink located in the heated areas, so that the electric field will cause the ink columns to be formed.

The ink was thereby caused to jet as droplets that are attracted to the surface of a recording member, such as recording paper, so that dot images can be recorded. Moreover, an image could be recorded by arranging the dots methodically.

Figure 1:
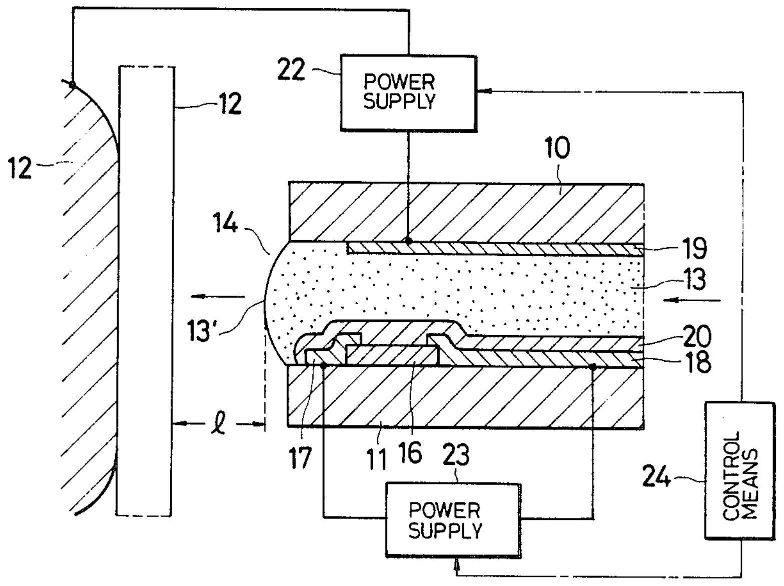
FIG. 1 is a vertical sectional view of an image recording head embodying the present invention.

FIG. 1 is a transverse sectional view of an image recording head and a peripheral portion embodying the present invention. As shown in FIG. 1, a pair of wall members 10, 11 are arranged so that one edge of each faces a recording member 12. The recording member 12 is preferably a sheet of ordinary recording paper for use in a conventional copying machine and is supported by a backing or opposite electrode 21.

The pair of wall members 10, 11 are separated by a fixed space that contains a liquid coloring agent 13. The edges of the wall members 10, 11 set opposite to the recording member 12 define a slit having a width in the direction perpendicular to the paper surface. The slit portion is called a discharge opening 14. The liquid coloring agent 13 forms a convex face 13' at the discharge opening because of the surface tension of the agent.

A plurality of heating resistors 16 are installed on the inner face of one wall member 11, the heating resistors being parallel to the edges of wall members 10, 11 and arranged in an array perpendicular to the paper surface. An electrode 17 common to the heating resistors 16 is connected to one end of each of them, whereas lead electrodes 18 are connected to the other end of corresponding heating resistors. A heat resistant insulating layer 20 is arranged to cover the heating resistors 16 and the electrodes 17 and 18. Moreover, roughly the whole inner face of the other wall member 10 is covered with an electric-field forming electrode 19.

Figure 3:
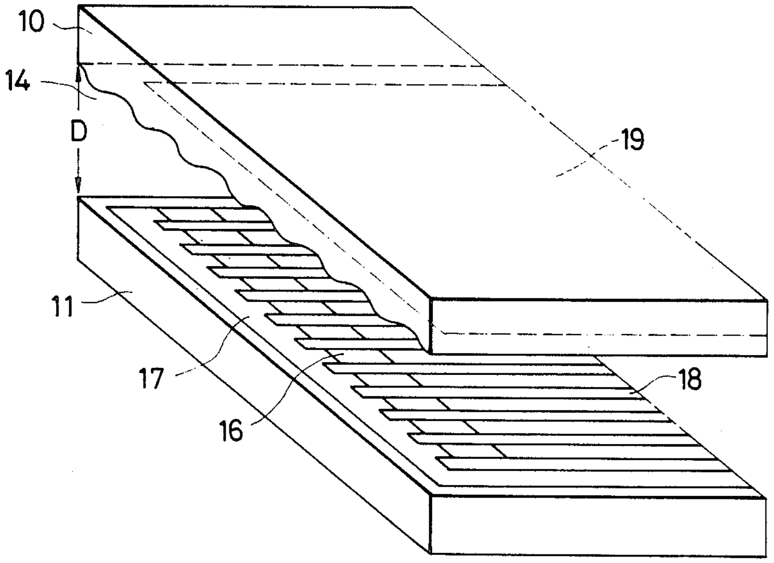
FIG. 3 is a perspective view of a principal portion of the head of FIG. 1.

FIG. 3 is a perspective view of the principal portion of the recording head. The heating resistors 16 set in array are preferably constructed in the same manner as that in the case of an edge-type thermal head. The so-called edge type thermal head is employed in this example to provide a recording with a density of 8 dots/mm on thermal recording paper having a color development temperature of about 90° C. When a recording is made on the thermal recording paper, 0.5 Watts per dot (W/dot) power is supplied to each heating resistor for 1 millisecond (msec). The space D selected between the pair of wall members 10, 11 was set up at 100 micrometer μm).

As shown in FIG. 1, the gap l between the discharge opening 14 and the recording member 12 was set at 200 μm, and the gap between the discharge opening 14 and the end of the heating resistors was also set at 200 μm. Further, an opposite electrode 21 was installed on the rear face of the recording member 12 and a power supply 22 for applying a fixed voltage there across was connected to the opposite electrode 19. The electric-field forming electrode 19 was grounded and +1,500 volts (V) was applied to the opposite electrode 21 to provide an electric field applying means.

A power supply 23 was also connected to both the electrodes 17, 18 connected to each of the heating resistors 16, to provide a thermal energy applying means. A control means 24 was connected to the power supplies 22, 23 to switch electric energy on/off in response to an image signal representing an image being recorded. The control means 24 preferably includes a circuit constituted by a shift register driver for driving known thermal heads and the like.

The liquid coloring agent 13 was, in this example, ink containing about 15% by weight of carbon-black pigment dispersed in liquid paraffin, with volume resistivity at 20° C. being $1.0\times 10^6$ ohm per centimeter Ω·cm), viscosity of 300 centipoise (cp), and surface tension of 70 dyne/cm. When the voltage derived from the power source 22 was applied across the electric field forming electrode 19 and the opposite electrode 21 in the recording head, the liquid coloring agent located close to the discharge opening 14 was subjected to a uniform electric field.

Electrical current, e.g., 25 milliampares (mA) at 25 V, was selectively supplied to the heating resistors 16 for 1 msec in the aforesaid state. Under these conditions, only the ink 13 located close to the heating resistor 16 supplied with the current was jetted at the recording member 12 and a circular dot about 150 μm in diameter was recorded on the recording surface. Even when the length of time required for supplying power was shortened to 200 μsec, recording could be made in the same manner.

When the above operation was conducted with no voltage applied across the electric field forming electrode 19 and the opposite electrode 21, the ink was not caused to jet at the recording surface. When the voltage being applied across the electric-field forming electrode 19 and the opposite electrode 21 was raised without supplying the current to the heating resistor 16, the ink 13 throughout the discharge opening 14 began to jet randomly at a voltage level exceeding 3,000 V.

Figure 4A:
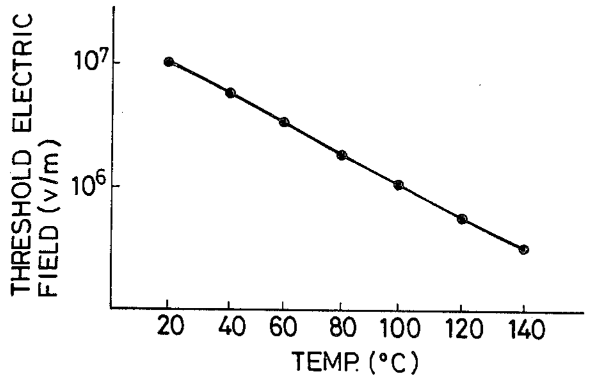
FIGS. 4(A)–4(D) are graphs showing the dependance of the threshold value of an electric field on temperatures and the properties of ink.
Figure 4B:
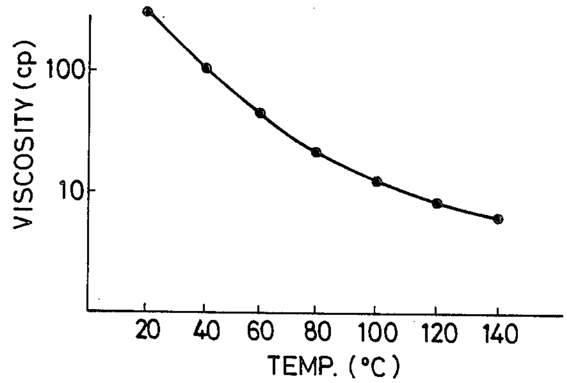
Figure 4C:
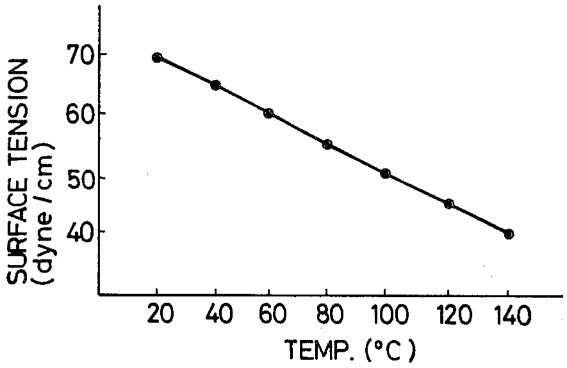
Figure 4D:
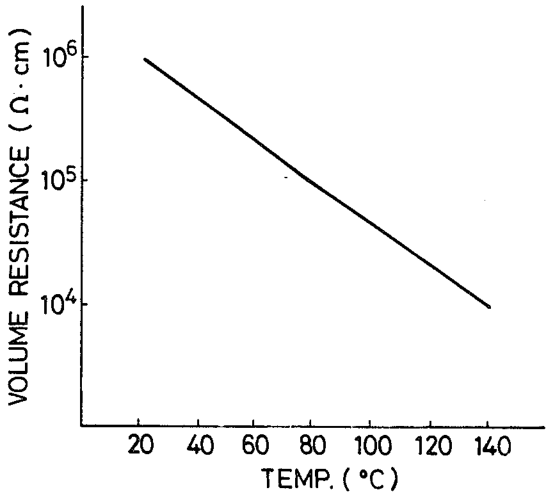

Since both electric and thermal energies are applied to cause the liquid coloring agent to jet, the conditions under which effective jetting is accomplished must correspond at best to some marginal values. FIGS. 4(A)–4(D) are graphs showing the results of experiments intended to find the threshold values for electric and thermal energies. According to the data shown in FIG. 4(A), the higher the ink temperature, the lower the corresponding threshold electric field value. As shown in FIG. 4(B), the viscosity of the ink decreases as the ink temperature rises. The same trend is observed in the cases of the surface tension FIG. 4(C) and specific volume resistance FIG. 4(D). In other words, the required threshold electric field value decreases as the temperature rises, and the relationship therebetween is affected by the composite effects of changes in physical properties including the viscosity, surface tension, and electrical conductivity of the ink.

Accordingly, for the same electric field which does not cause the ink to jet at the room temperature, the ink will jet when it is locally heated because of the cooperative action of the heat and static electric field, so that picture element recording may be carried out.

Figure 5:
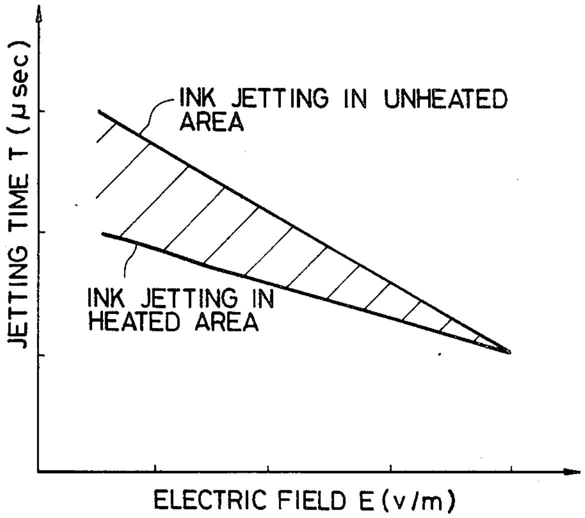
FIG. 5 is a graph showing the jetting characteristics of ink.

The relationship between the jetting characteristics of the ink to the intensity of the electric field is shown in FIG. 5. As shown in FIG. 5, a time T required for jetting and converting the ink into a picture element is proportionally shortened as the intensity E of the uniformly applied electric field increases. Also, the difference between the time required to cause the ink in the heated area to jet and the time it takes to cause ink in the unheated area to jet tends to be shortened as the intensity E of the electric field increases.

In other words, for unheated ink the jetting time T is shortened as the intensity of the electric field is increased and high-speed recording thus becomes possible on one hand, but on the other, jetting errors will tend to occur. Also, with the application of the electric field, if the heating resistor is energized for too short of a time, the ink temperature is insufficiently raised and the resultant dot may be too small or may split.

In order to ensure that the ink is caused to jet out stably and in a controllable manner while maintaining high-speed recording, it is necessary to control the heating time required to raise the ink temperature, apply an electric field with an appropriate intensity, and restrain the ink in the unheated area from jetting out.

According to the experiments performed by the inventor, the ink in the unheated area was seen to jet as a dot train at a regular pitch or frequency when a threshold electric field was applied. The pitch of the dot train was shortened as the intensity of the electric field was increased but was uniformly longer than the pitch of a dot train jetted upon selective heating of the heating elements.

Detailed studies of the jetting phenomenon of the dot train in the unheated area made the following clear: Although the ink is subjected to Coulomb force in the electric field, a wave is generated on its surface because it is incompressible. Its wavelength is determined by the liquid ink pressure, surface tension, viscosity resistance, gravity, etc. The generation of such a wavelength is related to an electric fluid mechanical surface wave.

Various wavelengths result, depending upon the balance of forces, including electrostatic force, pressure, gravity, surface tension, viscosity resistance, etc., but the growth rates, n [$sec^{-1}$], of waves in the direction of the applied electrostatic force have different values depending on the wavelength. As a consequence, the growth of a wave surface corresponding to a wavelength, λ, maximizing n occurs with first priority and, with the wavelength λ, the equally spaced dot train pitch is determined.

Figure 6:
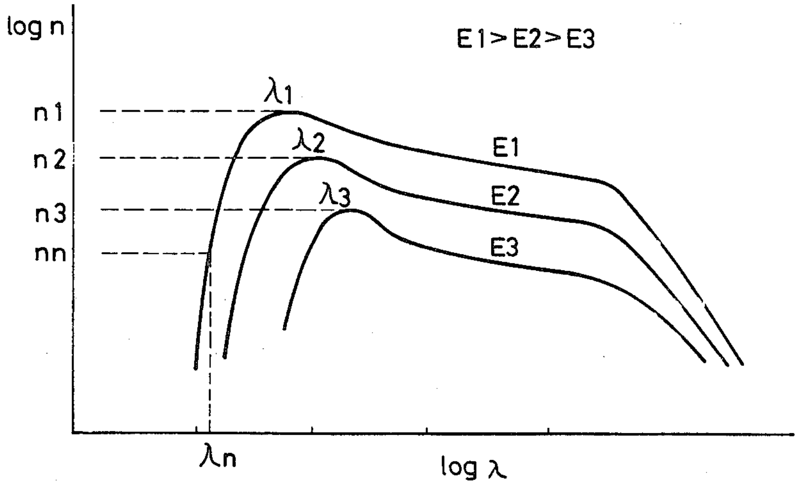
FIG. 6 is a graph illustrating the growth of a surface wave generated in the ink discharge portion.

FIG. 6 shows typical solutions obtained from the calculation of the theoretic relationship between n and λ with the intensity E of the electric field applied. λ1, λ2, λ3 for maximizing n with the intensity E1, E2, E3 of each electric field as a parameter were seen to roughly conform to the dot pitch within experimental accuracy.

According to the present invention, at least one of the wall members 10, 11 is so processed as to have a methodically uneven pattern on the surface of its inner face which restrains, or modulates, the generation of a surface wave that would cause the ink to be jetted out erroneously.

Figure 7:
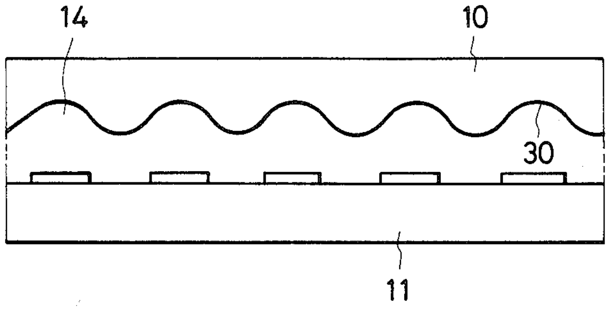
FIG. 7 is a principal end face diagram showing a head according to the present invention.

FIG. 7 shows wall members 10, 11 embodying the present invention, wherein the inner face of the wall member 10 on the ink discharge opening 14 side has been processed so that it has a methodical corrugated surface 30 which is waveform, formed by a series of parallel ridges and grooves on its surface opposite heating elements 16.

Figure 8:
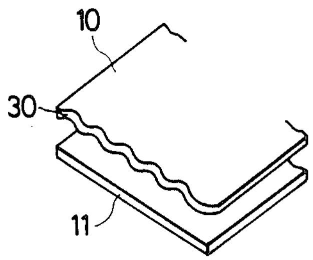
FIGS. 8 and 9 are perspective views of the principal portions of other heads embodying the present invention.
Figure 9:
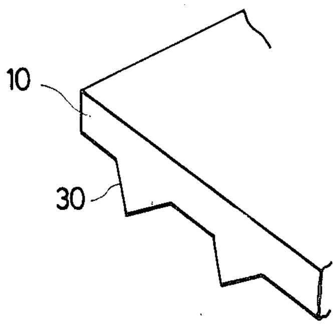

FIG. 8 shows another example of the wall members, wherein a wall member 10 has been processed into a wavy uneven board, whereas FIG. 9 shows a wall member 10 having triangular unevenness, wherein the parallel ridges of the corrugations are triangular rather than wavy forms.

In addition to the aforesaid, the inner face of the wall may be formed with parallel grooves wherein the ridges and/or the grooves of the channels are square. Moreover, either one of the wall members 10 and 11, or both of the members, may be processed to provide such an uneven surface 30.

With the formation of such methodical unevenness in the ink discharge portion such as shown by the aforementioned examples, any change in the flow rate resulting from the modulation of the surface waves in the proximity of the ink discharge portion 14 makes the wavelength of a liquid mechanical surface wave synchronize with a modulation wavelength λn. In other words, assuming the allowable intensity of the electric field restraining erroneous jetting exists at E3 of FIG. 6 when no modulation is provided, a surface wave with the fastest wave n3 at a wavelength of λ3 grows and, by providing the modulation for the discharge portion, the surface wave is made to synchronize with another at a wavelength of λn. However, no λn exists in this case and therefore no surface wave is produced.

When the intensity of the electric field is increased up to E1 so as to raise the speed of the head, a surface wave at a wavelength of λ1 is produced without the modulation. But the surface wave attempts to synchronize with λn when the modulation is provided. Accordingly, the surface wave is forced into a slow wave corresponding not to a growth rate n1 but nn in a low temperature area and the ink in the unheated area is restrained from flying out.

The ink in the unheated area is thus restrained from jetting out even if an intense electric field is applied, and not only electric field application time but also heating time is prolonged to some extent.

The wall members 10, 11 are prepared from any suitable material, such as glass, expoxy resin or Bakelite resin and may be provided with the modulation in the form of methodical unevenness at least near the heating resistors 16. Since the ink is caused to jet with the heating means as a unit, the pitch of the modulations in the surface of the wall member is preferably equal or less than the pitch of the heating resistors.

In the case of the example shown in FIG. 7, dye solution oil ink was used as the ink involved with the following properties at 20° C.: specific volume resistance$=10^7\Omega\cdot$cm. viscosity$=$30 cp; and surface tension$=$37 dyne/cm. Moreover, the recording density of the head was 8 dots/mm the gap D between the wall members was 100 μm, the gap between the recording member and the discharge portion was 30 μm, the power supplied to the heating resistors was 20 V for 1 msec, and the modulation wavelength λ was 125 μm.

In that case, no ink in the unheated area was caused to jet out during the application of an electric field at 2,000 V applied for 5 msec or 3,000 V applied for 1 msec. When λn was set equal to a pitch at which the heating resistors were arranged as shown in FIG. 7, the positional accuracy of the fitted dots was improved when compared to a different value for λn.

For comparison, a recording head without modulation was operated likewise and the ink in the heated area was seen to jet at or above 2,000 V applied for 1 msec. In order to stabilize the recording dots, however, electric fields of, for example, 2,000 V applied for 5 msec or 3,000 V applied for 1 msec were required. In the latter case, however, the ink in the heated area was seen to jet out.

As set forth above, the present invention accomplishes stabilization of recording dots and realizes high-speed recording by providing modulation to restrain the ink from jetting in the ink discharge portion. The construction of the ink discharge portion is not limited, however, to any of the shapes specifically described herein.

The image recording head according to the present invention is capable of jetting the ink for high-speed and high-density recording when the ink is heated to a temperature less than that causing thermal deterioration of the ink or the heating resistors and other parts subjected to an electric field. However, this field should not be so intense as to cause leakage across the electrodes.

Moreover, the recording head for holding the ink is relatively simple in construction and needs no complicated precise mechanism. Furthermore, comparatively small quantities of the electric and thermal energies are sufficient, so that the driving circuit may be made compact.

It will be apparent to those of ordinary skill in the art that various modifications and variations can be made to the above-described embodiments of the invention without departing from the scope of the following claims and their equivalents.

What is claimed is:

1. An image recording head for jetting a liquid coloring agent at a recording member to form images of corresponding picture elements comprising:

a pair of wall members arranged a fixed space apart to contain the liquid coloring agent between the inner faces thereof, the edges of said wall members forming a discharge portion on one side thereof, the inner face of at least one of said wall members having a methodically uneven pattern in said discharge portion composed of a plurality of portions with similar cross-sections;

thermal energy applying means for heating the liquid coloring agent between said wall members; and electric energy applying means for applying an electric field to the liquid coloring agent between said wall members; said thermal energy applying means comprising at least one heating element on the inner face of one of said wall members, for selectively heating an area thereof corresponding to a location for jetting a portion of the liquid coloring agent through said discharge portion.

2. The image recording head of claim 1, wherein said thermal energy applying means includes a spaced-apart array of said heating elements, each of said heating elements being located in a position corresponding to a different recording picture element and wherein said uneven pattern comprises a series of parallel channels methodically disposed with respect to said heating elements to inhibit erroneous jetting of said liquid coloring agent.

3. The image recording head of claim 1, wherein said thermal energy applying means and said electric energy applying means are adapted to apply each of said energies to a selected area of liquid coloring agent when arranged between said wall members so as to cause only that portion of said agent in the area to which both of said energies are applied to jet from said discharge portion.

4. The image recording head of claim 3, wherein said electric energy applying means includes means for uniformly applying an electric field to all of said liquid coloring agent and wherein said heating element is adapted to apply thermal energy to at least one selected local area of said liquid coloring agent.

5. The image recording head of claim 4, further comprising a first power supply connected to said electric energ applying means, a second power supply connected to said thermal energy applying means, and control means connected to each of said power supplies and adapted for controlling the supply of electrical power to said electric and thermal energy applying means in response to an image signal representing an image to be recorded.

6. A method of recording images at high speed comprising the steps of:

providing a recording head including a pair of spaced apart wall members with a liquid coloring agent therebetween;

applying a uniform electric field to the liquid coloring agent arranged between the pair of wall members;

heating said agent in a selected local area thereof to cause said agent to be jetted from the selected area at a recording medium; and providing on one of said wall members a periodic pattern of modulation to restrain said agent in unheated areas thereof from being jetted.

7. An image recording head for jetting a liquid coloring agent at a recording member to form images of corresponding picture elements comprising:

a pair of wall members arranged a fixed space apart to contain the liquid coloring agent between the inner faces thereof, the edges of said wall members forming a discharge portion on one side thereof, the inner face of at least one of said wall members having a methodically uneven pattern in said discharge portion composed of a plurality of portions with similar crosssections;

thermal energy applying means for heating the liquid coloring agent between said wall members; and electric energy applying means for applying an electric field to the liquid coloring agent between said wall members, said electric energy applying means comprising at least one electrode element on the inner face of one of said wall members for selectively generating a local electrical field in an area of said discharge portion corresponding to a location for jetting a portion of the liquid coloring agent therefrom.

* * * * *